United States Patent
Knill et al.

(10) Patent No.: US 7,472,605 B2
(45) Date of Patent: Jan. 6, 2009

(54) MAGNETIC TRANSDUCER HAVING ELECTRODES WITH METAL AND A LAYER OF A SALT OF THAT METAL

(75) Inventors: Alexander Charles Knill, Cambridge (GB); Anthony Robert Glauser, Oxford (GB)

(73) Assignee: Sentec Limited, Cambridge (GB)

( * ) Notice: Subject to any disclaimer, the term of this patent is extended or adjusted under 35 U.S.C. 154(b) by 109 days.

(21) Appl. No.: 10/552,530

(22) PCT Filed: Apr. 14, 2004

(86) PCT No.: PCT/GB2004/001618

§ 371 (c)(1), (2), (4) Date: Oct. 25, 2006

(87) PCT Pub. No.: WO2004/090475

PCT Pub. Date: Oct. 21, 2004

(65) Prior Publication Data

US 2007/0022823 A1 Feb. 1, 2007

(30) Foreign Application Priority Data

Apr. 14, 2003 (GB) ................... 0308446.4

(51) Int. Cl.
*G01F 1/58* (2006.01)

(52) U.S. Cl. ................... 73/861.12
(58) Field of Classification Search ............. 73/861.12, 73/861.15
See application file for complete search history.

(56) References Cited

U.S. PATENT DOCUMENTS

| | | | |
|---|---|---|---|
| 3,299,703 A | | 1/1967 | Colvin |
| 3,942,377 A | * | 3/1976 | Ginzburg et al. ......... 73/861.15 |
| 4,347,738 A | * | 9/1982 | Sanderson ............... 73/170.29 |
| 2007/0227248 A1 | * | 10/2007 | Glauser .................... 73/514.39 |

FOREIGN PATENT DOCUMENTS

JP 54116960 9/1979

* cited by examiner

*Primary Examiner*—Harshad Patel
(74) *Attorney, Agent, or Firm*—Sean Liam Kelleher; Kelleher IP, PLLC

(57) ABSTRACT

A magnetic transducer (109) for measuring the flow of a fluid (108) has electrodes (102) and an alternating magnetic field (107), an electrode (102) having lower noise energy at frequencies below 5 Hz than an electrode comprising carbon or corrosion-resistant metal alloy. The noise characteristic of the electrode (102) at magnetic field frequencies around 1 Hz is lower than that of an electrode comprising carbon or corrosion-resistant metal alloy.

48 Claims, 5 Drawing Sheets

MAGNETIC TRANSDUCER HAVING ELECTRODES WITH METAL AND A LAYER OF A SALT OF THAT METAL

TECHNICAL FIELD

This invention relates to magnetic flow transducers and in particular to magnetic water flow meters.

BACKGROUND ART

In a conventional utility water meter, a mechanical flow transducer (typically positive displacement or single/multi-jet turbine) is coupled to a register mechanism that measures the number of repetitive cycles of the transducer. This mechanism is often a mechanical odometer. To interface this to the electronics required for remote meter reading can be cumbersome and expensive, even when the odometer is replaced by a solid state register having digital counters.

Use of a flow transducer that is also solid-state reduces such interface problems. Such a flow transducer is a magnetic flow transducer of a kind that is well known and shown by way of example in the cross-sectional view of FIG. 1.

Flow tube, 101 incorporates a magnetic transducer 109 comprising a pair of electrodes, 102, disposed across a diameter of the pipe 101, with at least part of one surface of each electrode 102 in intimate contact with the fluid 108 in the pipe. Magnetic pole pieces, 103, are disposed across the orthogonal diameter of the pipe 101 and linked by a magnetic circuit, 104. As is well known in the art, the magnetic field 107 imparts a force on charged species moving with a bulk medium (ions in the case of water), causing the charged species to migrate in a direction orthogonal to both the magnetic field and the direction of bulk fluid motion. The mutual displacement of oppositely charged species results in an electric field along the direction of migration, which builds up until the electrostatic force on a given ion is balanced by the magnetic force. Since the magnetic force depends implicitly on the bulk medium flow velocity, measurement of the opposing electric field (or potential difference) provides a convenient means for determining the flow rate, whilst integration over time allows the total volume that has passed through the tube to be calculated. Circuitry for processing the electrode signals to obtain such measurements is well known in the art and consequently not described in greater detail here.

As is also well known, it can be advantageous to alternate the applied magnetic field, so as to overcome various limitations of a static field measurement. One such limitation is imposed by the nature of the electrodes used to measure the electrical potential difference in the fluid. An ideal electrode will form a perfect electrical connection to the fluid, with no energy barrier to the exchange of charge either way across the solid-liquid interface. This is seldom observed in practical systems, and it is much more likely that an electrical potential difference will be present across the interface. The potential difference is often poorly defined, and varies randomly with time such that it exhibits a noise spectrum that is inversely proportional to frequency ('1/f). A static field (DC) measurement will therefore be subject to large instantaneous errors.

Alternating the applied magnetic field at a known frequency $f_o$ partially overcomes this problem: as shown in FIG. 2, this results in the desired electrical signal 201 also being present at the frequency $f_o$ which is chosen to be significantly higher than the characteristic frequency of the electrode noise spectrum 202. Measurement of the electrical signal amplitude a provides an indication of the flow rate that is substantially free of errors.

A further reason for applying an alternating magnetic field is that the small-signal electrical impedance of typical electrodes, as perceived by a measuring circuit attached between them, also falls with increasing frequency. The measuring circuit may therefore be permitted to draw more current from the signal source, without causing substantial errors. The principal advantage is that a simpler, cheaper measuring circuit design may be adopted.

To understand the frequency-dependent behaviour of the electrodes, it is useful to consider a simple electrical model of FIG. 3 that is often applied to the solid-liquid interface 301, consisting of a resistor 302 in parallel with a capacitor 303. The direct exchange of charged species between the solid 304 and the liquid 305 is signified by the flow of current through the resistor 302, while the capacitor 303 represents the tendency of charged species to accumulate in the vicinity of the interface, without actually crossing it. At frequencies substantially above 1 Hz, the capacitor 303 generally provides the easier route for the flow of a small-signal current through a solid-liquid interface.

In the device of FIG. 1, an alternating magnetic field is achieved by means of coils 105 wound around part of magnetic circuit 104 and supplied with a suitable alternating current waveform. Furthermore, to reduce power consumption, it is known to provide magnetic circuit 104 with one or more elements 106 exhibiting magnetic remenance so that the coils need only be energised when it is required to change the state of the magnetic field.

The present invention has as an objective yet further reduction in the power consumption of magnetic flow transducers.

DISCLOSURE OF INVENTION

Accordingly, the invention consists in a magnetic flow transducer having electrodes and an alternating magnetic field, wherein an electrode has lower noise energy at frequencies below 5 Hz than an electrode comprising carbon or corrosion-resistant metal alloy.

The invention is based on the recognition that by using an electrode having lower noise energy at low frequencies than the electrodes conventionally used in water meters, the frequency of the alternating magnetic field can be reduced for the same signal to noise ratio which in turn reduces the power consumption of the transducer.

In contrast, the electrodes of known magnetic flow transducers are chosen for their immunity to corrosion effects and consequently made of corrosion-resistant metal alloys such as stainless steel or Hastelloy. In such known transducers, the electrochemical potential across the interface is poorly-defined, permitting large variations over a longer period of time, of the order of seconds. However, since known transducers operate at a magnetic field frequency much greater than 1 Hz, this has not caused problems. Thus, expressed differently, the invention also consists in a magnetic flow transducer having electrodes and an alternating magnetic field, wherein an electrode has a noise characteristic at magnetic field frequencies around 1 Hz that is lower than that of an electrode comprising corrosion-resistant metal alloy.

Advantageously, the electrode is configured such that a galvanic current flows across its interface with the fluid of the flow. A galvanic current arises due to the movement or exchange of charged species through the solid-liquid interface. It is distinct from the displacement current which flows between the liquid and sensor electrodes in known magnetic flow meters and which flows as the result of opposing sheets of charge building up or dispersing either side of an interface without actually crossing the phase boundary. The galvanic current configuration significantly improves the electrical impedance and noise characteristics of the electrode.

Preferably, the electrode is configured such that the galvanic current is carried by ions. Silver ions are particularly advantageous since solid silver is stable in water over a long period of time and does not corrode significantly. Moreover, it is non-toxic and a permitted food additive (E174). Silver is also close to copper in the electrochemical series, reducing the risk of unwanted electrolytic corrosion in water pipes. It is also biocidal, helping to prevent stagnation and formation of troublesome biofilms in and around electrodes.

In a preferred embodiment, the electrode comprises a metal and a salt of that metal interposed between the metal and the fluid of the flow, thereby to assist the charge exchange between the conductor and the fluid that underlie galvanic current. The salt or ionic compound is preferably sparingly soluble in the fluid of the flow of which is to be measured and is thus retained at the electrode. Where the metal is silver, the ionic compound may be a silver halide salt. Furthermore, where the fluid is water, such silver halide salts are advantageously formed by the ions most commonly present in tap water (chloride, fluoride). Silver halides form a stable electrochemical half-cells in contact with the metal.

The electrode may comprise a layer of metal salt electrochemically deposited on a metal surface, e.g by anodizing. Alternatively, it may comprise a sintered layer of metal salt on a metal surface. The thickness of the layer will affect the impedance of the electrode: if it is too thick, it will add an excessive series impedance to the total electric circuit, whereas if it is too thin, the concentration will be insufficient to maintain the required electrochemical reactions. The thickness of the layer is therefore preferably chosen, e.g. empirically, to lie between these two extremes such that the impedance of the electrode is at a minimum.

Further improvement in the noise and electrical characteristics may be achieved by an electrode having a metal surface that has been roughened so as to increase its active area. This may conveniently be achieved by reducing some of the metal salt back to metal, which typically results in a re-growth of metal that is non-uniform and rough.

Preferably, a pair of electrodes of the magnetic flow transducer will be balanced so as to minimise the offset potential between the two. Each electrode acts as a separate electrochemical half-cell, with a corresponding potential difference relative to the liquid. If the electrodes are not identical, the difference between the two half-cell potentials will be present between the electrode terminals, and this may cause problems with the subsequent amplification circuitry (e.g. saturation).

The low-power advantages of the above invention are further enhanced by the reduction in power consumption obtained when the magnetic field is generated by means exhibiting magnetic remenance as discussed above. The invention also comprises a flow meter incorporating such a magnetic transducer, where the low power consumption of the transducer also makes feasible the use of battery power (shown at 110 in FIG. 1) and the advantages in terms of ease of installation that this brings.

BRIEF DESCRIPTION OF DRAWINGS

The invention is diagrammatically illustrated, by way of example, in the accompanying drawings, in which.

BEST MODES FOR CARRYING OUT THE INVENTION

Figure 1:
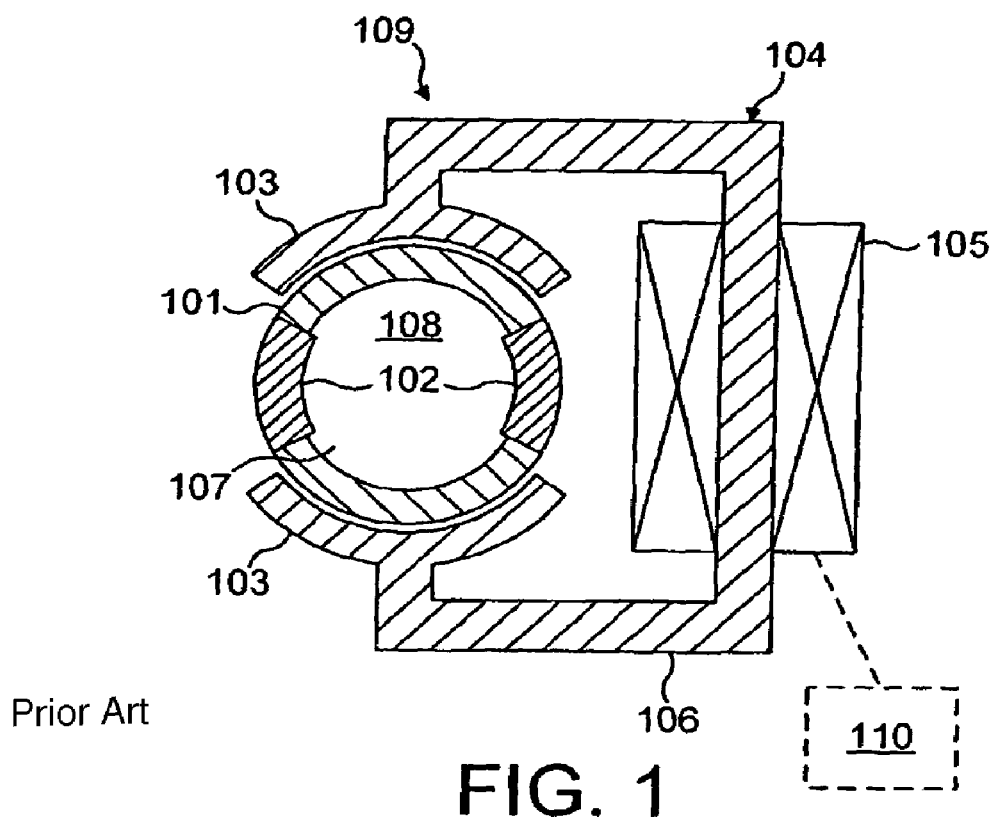
FIG. 1 is a cross-sectional view of a flow tube equipped with a magnetic flow transducer.
Figure 2:
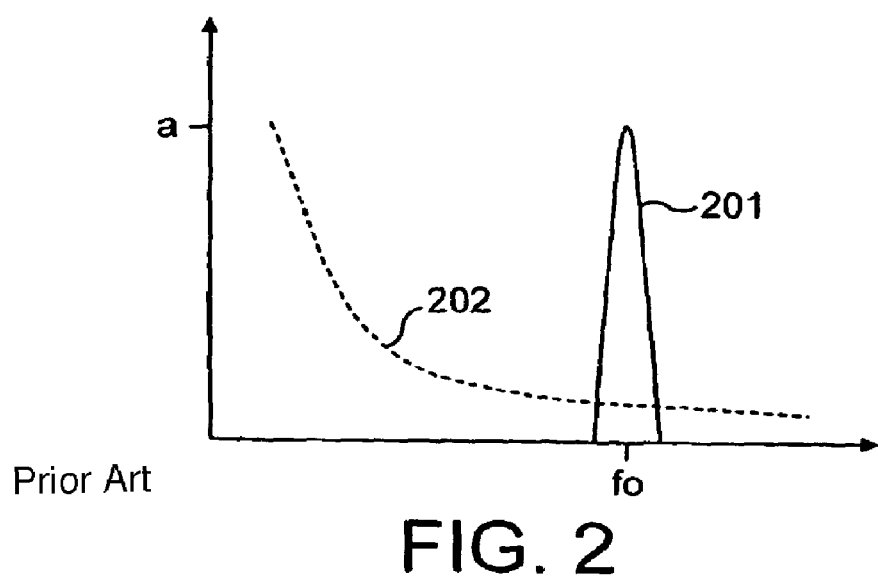
FIG. 2 illustrates the amplitude/frequency characteristics of the signal from the electrodes.
Figure 3:
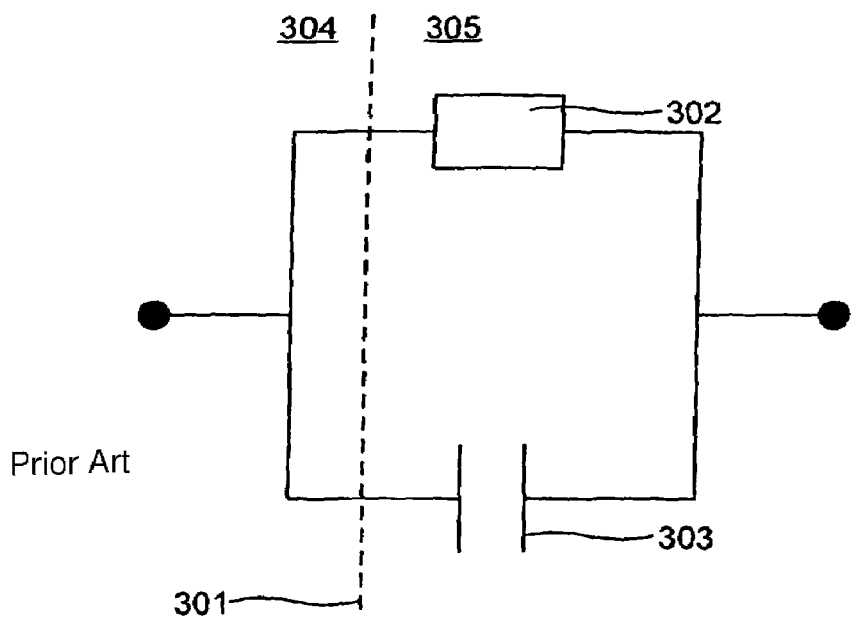
FIG. 3 is a simple electrical model of the solid-liquid interface.
Figure 4:
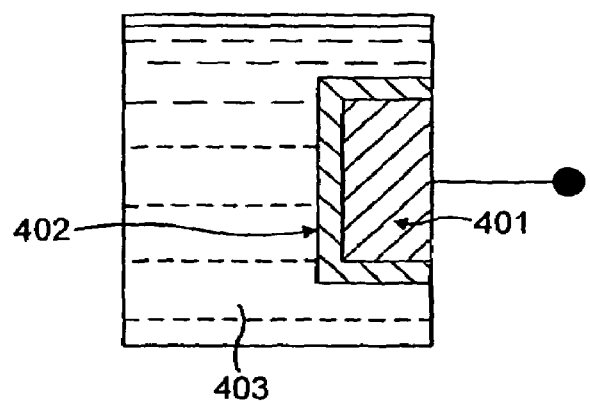
FIG. 4 shows an electrode of a first embodiment of the invention.

FIG. 4 shows an electrode of a first embodiment of the invention and comprising a metal element 401 (e.g. a wire, a plate, or a film completely covering an underlying conductor) coated with an ionic compound 402 of the same metal, which is sparingly soluble in the fluid of the flow to be measured 403.

Figure 5:
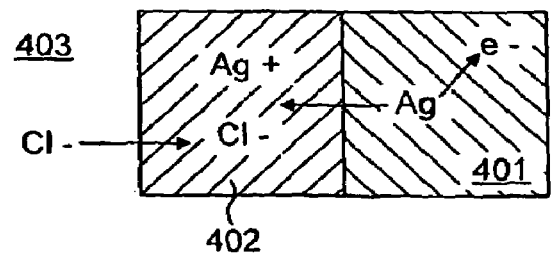
FIG. 5 illustrates the fully-reversible, galvanic exchange of charge between the fluid and the metal.
Figure 11:
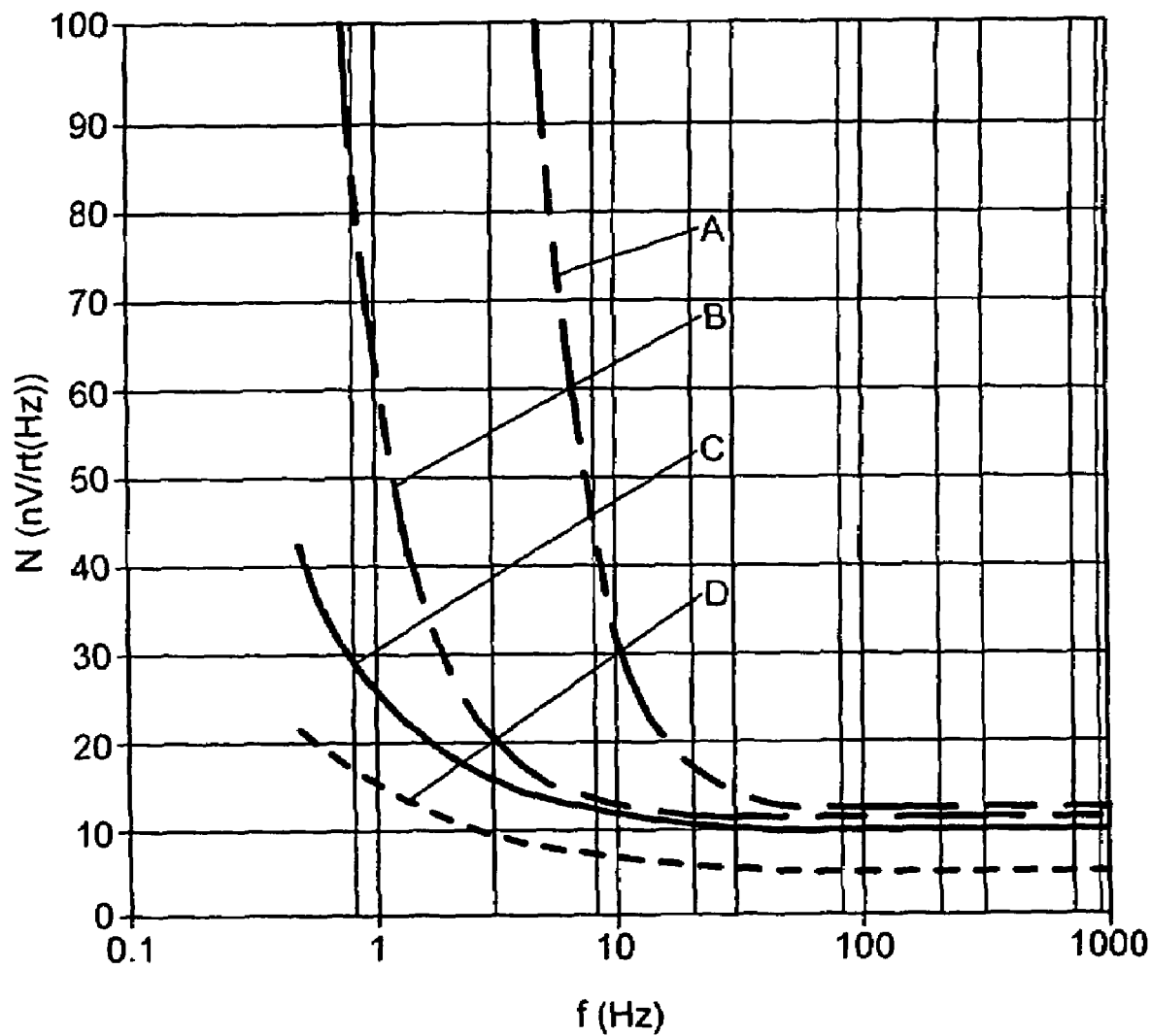
FIG. 11 is a graph of noise density against frequency for various electrode materials.

In the example shown, the metal 401 is silver, with the accompanying compound 402 being silver chloride. FIG. 5 illustrates the fully-reversible, galvanic exchange of charge between the fluid 403 and the metal 401 by means of silver ions crossing the phase boundary between the solid silver electrode 401 and the hydrated silver chloride layer 402. The electrical potential across the interface is defined by the Nernst equation, which in turn depends on the surface concentration of AgCl and the liquid concentration of Cl ions. While these quantities will not be constant, they may normally be expected to vary on a timescale much greater than the period of the alternating magnetic field. In accordance with the invention, the timescale of this variation is significantly longer than for an electrode surface which does not possess a controlled ionic exchange mechanism. Accordingly, operation at a lower frequency is facilitated because the noise energy is reduced. FIG. 11 shows (curve C) the variation in noise N with frequency f for electrodes comprising silver chloride compared with conventional steel or carbon electrodes (curves A and B). Baseline is shown at D.

Ionic compound layer 402 may be formed by the spontaneous reaction of the metal surface with species ordinarily present in the fluid. For example, silver electrodes are likely to react with the treatment agents (or residues) in a chlorinated water supply, ultimately producing silver chloride.

Figure 6:
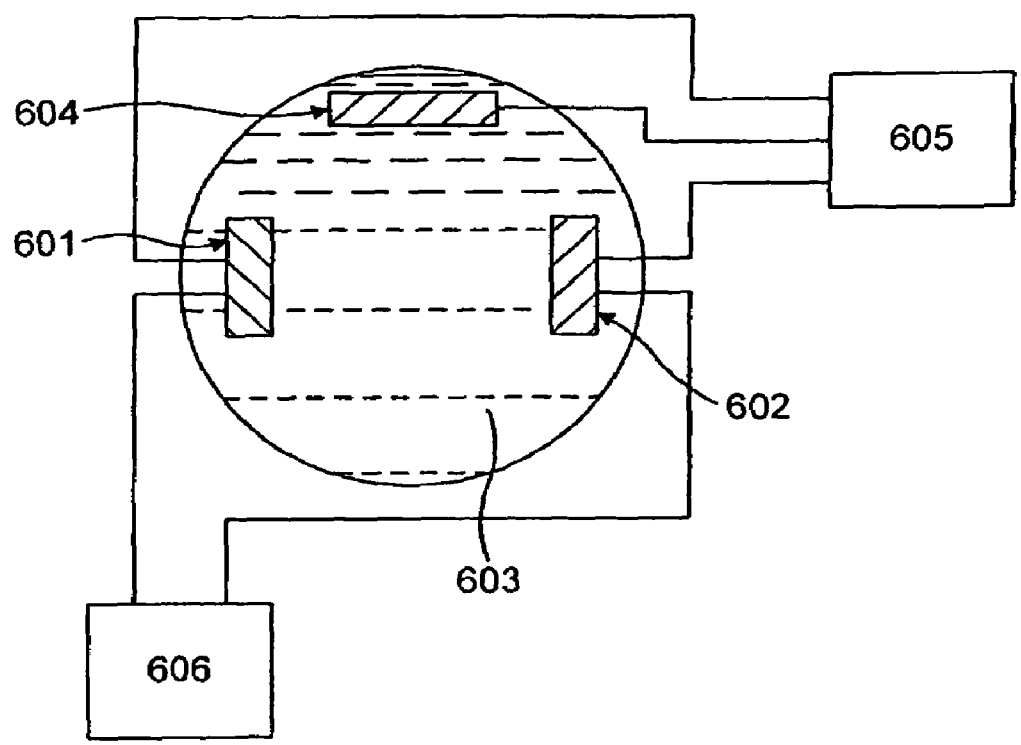
FIG. 6 illustrates an arrangement whereby the electrodes of the invention may be formed.

FIG. 6 illustrates apparatus for implementing a method for boosting the quantity of ionic compound for situations where spontaneous reactions are insufficient. A third electrode 604 is provided for making contact to the fluid 603, in addition to the measuring electrodes 601 and 602. Electrode 604 need not be made of the same material as 601 and 602 (e.g. graphite or steel would suffice). At intervals determined by control electronics 605, a substantial potential is applied between electrode 604, and the measuring electrodes 601 and 602. For the silver chloride system described above, the measuring electrodes 601 and 602 would both be held at a positive potential with respect to electrode 604, sufficient to cause a quantity of the silver in electrodes 601 and 602 to react with negatively charged ionic species in the vicinity. The ionic species would preferably be chloride, and the potential applied between the electrodes may be chosen to favour such a reaction.

The interval and duration of the above treatment may be determined in a number of ways. In the simplest implementation, the intervals at which it was applied would be fixed prior to installation. Alternatively, the intervals may be calculated according to properties of the electrical signal detected by the measuring unit 606. For example, an increased random variation in the signal from the electrodes (i.e. more noise) would signal that the electrode impedance is rising, most probably due to the depletion of ionic compound. This could be used to trigger a cycle of treatment to restore the coating. Alternatively, the state of the electrode coating could be determined using an active impedance measurement applied by the unit 406.

Figure 7:
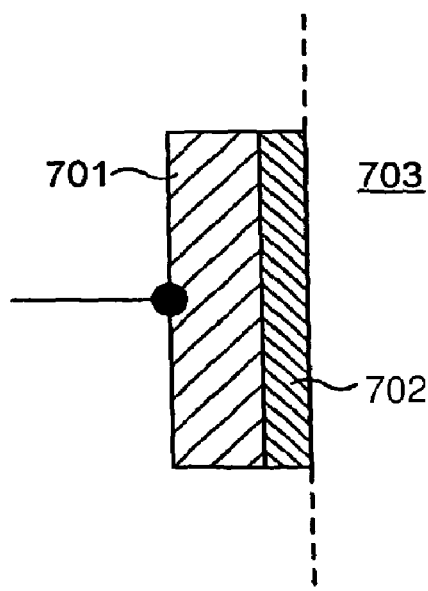
FIG. 7 shows an electrode prepared using the arrangement of FIG. 6.

FIG. 7 shows an electrode prepared using the above method and comprising a flat section of silver 701 coated electrochemically with a thin film of silver chloride 702. Positioned in direct contact with the flowing liquid 703, and preferably flush with the wall of the flow tube so as to reduce turbulence and the corresponding measurement noise and uncertainty, its surface will tend to be abraded over time by particulates in the liquid, thereby helping to maintain an active electrode surface.

Figure 8:
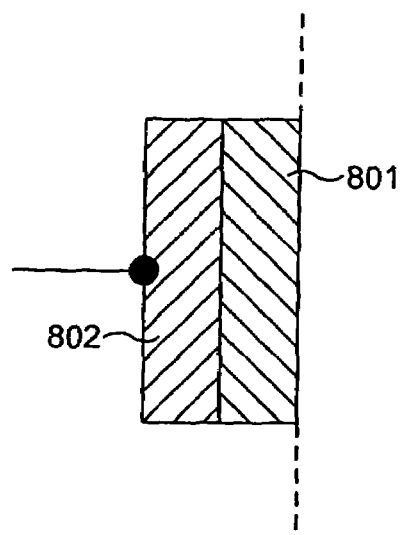
FIG. 8 shows a second electrode construction according to the invention.

Greater surface area, along with a more persistent reservoir of silver chloride, may be obtained by the use of silver chloride sintered onto a metal backing electrode, as shown at 801 and 802 respectively in FIG. 8. As shown, electrode 802 is monolithic, i.e. a single solid piece of wire or plate. However, a sintered construction is also possible. Metallic silver in the form of granules may also be included in the sintered silver chloride layer 801, the proportion of silver granules being chosen such that a substantial number make electrical contact with one another. Such a mixture of silver and silver chloride granules may be formed on a third monolithic metallic element such as a silver rod or plate.

Figure 9:
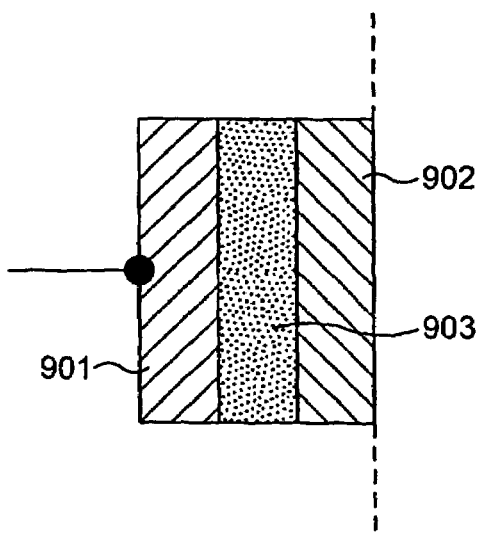
FIG. 9 shows a third electrode construction according to the invention.

FIG. 9 shows a further, more robust electrode construction according to the present invention that is also more stable with time and less susceptible to depletion and interference from contamination or flow effects. A monolithic silver plate 901 is set back behind a protective porous element, such as a frit 902, with an intervening reservoir 903 of silver chloride, which may be granules of silver chloride and/or silver, a powder or a sinter.

Figure 10:
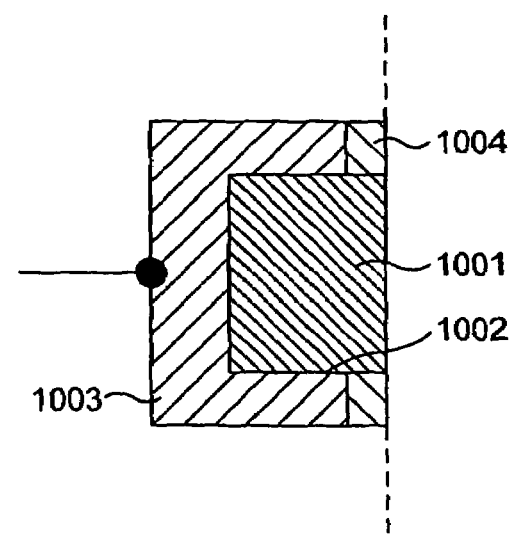
FIG. 10 shows a fourth electrode construction according to the invention.

FIG. 10 represents a composite of FIGS. 7 and 8, with sintered granules of silver chloride 1001 set in a central recess 1002 within a solid silver element 1003. The sintered section provides the most stable electrode under benign conditions, while the exposed silver (shown with a silver chloride layer at 1004) is better for coping with challenging conditions, e.g. dirty water, where porous elements are more likely to become blocked.

It will be appreciated that the silver chloride layer formed over the metal is too thick, it adds an excessive series impedance to the total electric circuit. If it is too thin, the concentration is insufficient to maintain the required electrochemical reactions. The optimal amount of chloride may be determined by monitoring the electrical impedance of the electrode in a stable electrolyte, either during electrode fabrication, or during subsequent operation. Cathodic or anodic treatment should be applied until the impedance is at its lowest achievable point.

In practice, the measured component of the impedance may be capacitance, resistance or a combination of the two. It may be measured between the terminal of the electrode and the terminal of a second electrode immersed in the same electrolyte and which may be another flow meter electrode. Alternatively, two electrodes may be maintained at the same mean electrical potential during treatment in such a way that a small differential alternating potential may be applied in order to measure the small-signal impedance between them (e.g. by connecting the electrode terminals together with an inductor).

It is also important to balance the electrodes to ensure the minimum electrical offset potential between the two. Each electrode acts as a separate electrochemical half-cell, with a corresponding potential difference relative to the liquid. If the electrodes are not identical, the difference between the two half-cell potentials will be present between the electrode terminals, and this may cause problems with the subsequent amplification circuitry (e.g. saturation).

To this end, the electrodes may be treated until they reach a common electrochemical half-cell potential. This may involve one or more of anodization, cathodization, exposure to a chemical agent or light, as described elsewhere in this document, the half-cell potential of the electrode being measured against a fixed standard half-cell, or against a second electrode which is not being treated at the same time. Alternatively, the treatment may involve connecting the terminals of two or more similar electrodes together for a period of time, while the electrodes are immersed in a common conductive electrolyte. Such electrode conditioning may be applied during the operating lifetime of the finished instrument, by the host electronics, as well as during initial fabrication.

The noise and electrical characteristics of the electrode can be improved by increasing its active surface area and thereby reducing its interface impedance. This can be achieved by known mechanical and electrochemical roughening techniques. Furthermore, by reversing the flow of current in the anodization treatment described above, AgCl can be converted back to metallic Ag, the re-growth of metal being as dendrites of metallic Ag form in amongst the AgCl, growing out from the metal surface. This also has the effect of increasing the active surface area of the silver electrode and is applicable to both the monolithic and sintered constructions, where it can be used to grow dendrites of metallic silver in amongst the granules.

The step of increasing surface area may be alternated with the step of formation of silver chloride as described above. It may also be carried out using other known means of reduction, for example heating in hydrogen gas or exposure to light.

It should be understood that the invention has been described by way of examples only and that a wide variety of modifications can be made without departing from the scope of the invention. In particular, the invention is not restricted to silver or its ionic compound or salt, silver chloride. Gold and platinum may also yield good results. Similarly, the invention is also applicable to fluids other than water.

The invention claimed is:

1. Magnetic transducer for measuring the flow of a fluid, the transducer having electrodes and an alternating magnetic field, wherein at least one of said electrodes has lower noise energy at frequencies below 5 Hz than an electrode comprising carbon or corrosion-resistant metal alloy and comprises a metal and a layer of a salt of that metal arranged such that the layer is interposed between the metal and the fluid, the layer being electrochemically deposited or sintered.

2. Magnetic transducer according to claim 1, wherein the layer of salt is sparingly soluble in said fluid the flow of which is to be measured.

3. Magnetic transducer according to claim 2, wherein the metal is silver.

4. Magnetic transducer according to claim 3, wherein the layer of salt comprises silver halide salt.

5. Magnetic transducer according to claim 4, wherein said silver halide salt is silver chloride or silver fluoride.

6. Magnetic transducer according to claim 1, wherein the thickness of the layer is such that the impedance of said at least one of said electrodes is at a minimum.

7. Magnetic transducer according to claim 1, wherein the surface of said at least one of said electrodes is roughened so as to increase its active area.

8. Magnetic transducer according to claim 7, wherein the layer is partially chemically reduced back to the metal.

9. Magnetic transducer according to claim 1, wherein said at least one of said electrodes comprising a pair of electrodes that are balanced so as to minimise the offset potential between said pair of electrodes.

10. Magnetic transducer according to claim 1 comprising means for generating the alternating magnetic field, said means exhibiting magnetic remenance.

11. Flow meter incorporating a magnetic transducer according to claim 1.

12. Flow meter according to claim 11, wherein the meter is battery-powered.

13. Magnetic transducer for measuring the flow of a fluid, the transducer having electrodes and an alternating magnetic field, wherein at least one of said electrodes has a noise characteristic at magnetic field frequencies around 1 Hz that is lower than that of an electrode comprising carbon or corrosion-resistant metal alloy and comprising a metal and a layer of a salt of that metal arranged such that the layer is interposed between the metal and the fluid, the layer being electrochemically deposited or sintered.

14. Magnetic transducer according to claim 13, wherein the layer of salt is sparingly soluble in said fluid the flow of which is to be measured.

15. Magnetic transducer according to claim 14, wherein the metal is silver.

16. Magnetic transducer according to claim 15, wherein the layer of salt comprises silver halide salt.

17. Magnetic transducer according to claim 16, wherein said silver halide salt is silver chloride or silver fluoride.

18. Magnetic transducer according to claim 13, wherein the thickness of the layer is such that the impedance of said at least one of said electrodes is at a minimum.

19. Magnetic transducer according to claim 13, wherein the surface of said at least one of said electrodes is roughened so as to increase its active area.

20. Magnetic transducer according to claim 19, wherein the layer is partially chemically reduced back to the metal.

21. Magnetic transducer according to claim 13, wherein said at least one of said electrodes comprising a pair of electrodes that wherein two of the electrodes are balanced so as to minimise the offset potential between said pair of electrodes.

22. Magnetic transducer according to claim 13 comprising means for generating the alternating magnetic field, said means exhibiting magnetic remenance.

23. Flow meter incorporating a magnetic transducer according to claim 13.

24. Flow meter according to claim 23, wherein the meter is battery-powered.

25. Magnetic transducer for measuring the flow of a fluid, the transducer having electrodes and an alternating magnetic field, wherein at least one of said electrodes has lower noise energy at frequencies below 5 Hz than an electrode comprising carbon or corrosion-resistant metal alloy and comprises a metal and a layer of a salt of that metal arranged such that the layer is interposed between the metal and the fluid, the layer being partially chemically reduced back to the metal.

26. Magnetic transducer according to claim 25, wherein the layer of salt is sparingly soluble in said fluid the flow of which is to be measured.

27. Magnetic transducer according to claim 26, wherein the metal is silver.

28. Magnetic transducer according to claim 27, wherein the layer of salt comprises silver halide salt.

29. Magnetic transducer according to claim 28, wherein said silver halide salt is silver chloride or silver fluoride.

30. Magnetic transducer according to claim 25, wherein said layer is electrochemically deposited.

31. Magnetic transducer according to claim 25, wherein said layer is sintered.

32. Magnetic transducer according claim 25, wherein the thickness of the layer is such that the impedance of said at least one of said electrodes is at a minimum.

33. Magnetic transducer according to claim 25, wherein said at least one of said electrodes comprising a pair of electrodes that are balanced so as to minimise the offset potential between the two.

34. Magnetic transducer according to claim 25 comprising means for generating the alternating magnetic field, said means exhibiting magnetic remenance.

35. Flow meter incorporating a magnetic transducer according to claim 25.

36. Flow meter according to claim 35, wherein the meter is battery-powered.

37. Magnetic transducer for measuring the flow of a fluid, the transducer having electrodes and an alternating magnetic field, wherein at least one of said electrodes has a noise characteristic at magnetic field frequencies around 1 Hz that is lower than that of an electrode comprising carbon or corrosion-resistant metal alloy and comprise a metal and a layer of a salt of that metal arranged such that the layer is interposed between the metal and the fluid, the layer being partially chemically reduced back to the metal.

38. Magnetic transducer according to claim 37, wherein the layer of salt is sparingly soluble in said fluid the flow of which is to be measured.

39. Magnetic transducer according to claim 38, wherein the metal is silver.

40. Magnetic transducer according to claim 39, wherein the layer of salt comprises silver halide salt.

41. Magnetic transducer according to claim 40, wherein said silver halide salt is silver chloride or silver fluoride.

42. Magnetic transducer according to claim 37, wherein said layer is electrochemically deposited.

43. Magnetic transducer according to claim 37, wherein said layer is sintered.

44. Magnetic transducer according to claim 37, wherein the thickness of the layer is such that the impedance of said at least one of said electrodes is at a minimum.

45. Magnetic transducer according to claim 37, wherein said at least one of said electrodes comprising a pair of electrodes that are balanced so as to minimise the offset potential between said pair of electrodes.

46. Magnetic transducer according to claim 37 comprising means for generating the alternating magnetic field, said means exhibiting magnetic remenance.

47. Flow meter incorporating a magnetic transducer according to claim 37.

48. Flow meter according to claim 47, wherein the meter is battery-powered.

* * * * *